United States Patent [19]

Mueller et al.

[11] Patent Number: 5,423,482
[45] Date of Patent: Jun. 13, 1995

[54] METHOD AND APPARATUS FOR INJECTING A LIQUID IN A WASTE HEAT REMOVAL SYSTEM, ESPECIALLY IN A SPACECRAFT

[75] Inventors: Robert Mueller, Moordeich; Jochem Unger, Hoechst, both of Germany

[73] Assignee: Erno Raumfahrttechnik GmbH, Bremen, Germany

[21] Appl. No.: 144,553

[22] Filed: Oct. 28, 1993

[30] Foreign Application Priority Data

Oct. 28, 1992 [DE] Germany .............. 42 36 371.3

[51] Int. Cl.⁶ ............................................ B05B 15/00
[52] U.S. Cl. ................................. 239/1; 239/119; 239/583; 137/312
[58] Field of Search ............ 239/1, 104, 106, 119, 239/120, 124, 463, 474, 583, 584, 585.1; 137/312

[56] References Cited

U.S. PATENT DOCUMENTS

| | | | |
|---|---|---|---|
| 2,077,938 | 4/1937 | Kuttner | 239/119 |
| 2,686,562 | 8/1954 | MacCracken et al. | 239/119 |
| 3,013,733 | 12/1961 | Williams et al. | 239/583 |
| 4,504,214 | 3/1985 | Stahl et al. | 239/104 |

FOREIGN PATENT DOCUMENTS 2105837  3/1983  United Kingdom .............. 239/106

OTHER PUBLICATIONS

Publication entitled: "Shuttle Orbiter Flash Evaporator", by J. R. Nason et al. Hamilton Standard, 79--ENAs-14, American Society of Mechanical Engineers (Editors).

Primary Examiner—Andres Kashnikow
Assistant Examiner—Lesley D. Morris
Attorney, Agent, or Firm—W. G. Fasse; W. F. Fasse

[57] ABSTRACT

An apparatus and a method of injecting a liquid are provided, especially for the intermittent, essentially drip-free injection of a liquid into a waste heat removal system in a spacecraft. The injection apparatus includes a housing having an inlet, an outlet, a discharge channel communicating with the outlet, and a receiving chamber controllably communicating with the discharge channel. A piston is movably arranged in the housing to define a boundary of the receiving chamber. A valve arrangement operates in response to the motion of the piston to respectively open or close the path of liquid communication between the receiving chamber and the discharge channel. This apparatus carries out the method, whereby when delivery of injection liquid is to be stopped any liquid remaining in the discharge channel is sucked out into the receiving chamber. Then, when delivery of injection liquid is to be resumed, the retained liquid is moved from the receiving chamber into the discharge channel.

24 Claims, 4 Drawing Sheets

METHOD AND APPARATUS FOR INJECTING A LIQUID IN A WASTE HEAT REMOVAL SYSTEM, ESPECIALLY IN A SPACECRAFT

FIELD OF THE INVENTION

The invention relates to an apparatus for the injection of a liquid, especially for the intermittent, drip-free injection of a liquid in a waste heat removal system in a spacecraft. The invention further relates to a method for carrying out such intermittent drip-free injection of a liquid, especially in a waste heat removal system in a spacecraft.

BACKGROUND OF THE INVENTION

The intermittent injection of a liquid that is to be vaporized may be carried out, for example, to achieve a constant mass flow and therewith a constant spatial distribution of the sprayed substance during a liquid delivery pulse. However, when a liquid injector is operated in such a pulsated or intermittent mode, after the end of each liquid pulse, it can occur that the pressure inside the space into which the liquid is sprayed, is lower than the vapor pressure of the injected liquid. This condition creates the danger that the liquid remaining in the discharge channel of the injector after the end of the liquid pulse may be vaporized. This can lead to a mixture of vapor and liquid coming out of the nozzle opening and forming drops of liquid on the nozzle. These drops are essentially ineffective, for example in achieving additional vaporization cooling, because they only wet a small area of the surface of a wall at which they are to be sprayed, or they remain directly near the nozzle opening. When these drops remain near the nozzle opening and vaporize there, it is likely that the liquid will freeze up near the nozzle opening, potentially plugging the nozzle unless auxiliary electrical heating elements are provided. However, providing electrical heaters would entail additional costs and efforts in manufacturing and operating the injector.

Furthermore, even with the provision of heaters, there would still be the disadvantage that the liquid coming out of the nozzle as unintended droplets cannot contribute to the intended heat exchange process or, that is to say, in the intended cooling effect. Thus, cooling liquid is wasted and the useable quantity of cooling liquid is reduced. This is especially disadvantageous in applications in the field of space travel, because maximum gross vehicle weights are strictly limited and any additional weight attributable to cooling liquid that will be wasted will directly reduce the allowable payload weight. Thus, the total relative costs of a space mission are increased.

Generally, it is known to use so-called vaporizing heat exchangers in a space vehicle to remove from the vehicle the waste heat generated, for example, by the electrical equipment on board. The removed heat is expelled into space outside the vehicle. Such vaporizing heat exchangers are described, for example, in the publication "Shuttle Orbiter Flash Evaporator", by J. R. Nason et al., Hamilton Standard, 79-ENAs-14, American Society of Mechanical Engineers (Editors). In these vaporizing heat exchangers a cooling fluid, which circulates through several active cooling circuits, is brought into thermic contact with a medium that is to be vaporized. This medium is sprayed as a jet of liquid drops through an injection nozzle into the operating space or working chamber of the heat exchanger. Thereby, the drops contact the walls bounding this working chamber, through which walls flows the above-mentioned cooling fluid. By absorbing heat from the chamber walls, and thereby extracting heat from the cooling fluid, the liquid drops transition into the vapor phase, whereupon the vapor is blown out of the spacecraft into space.

OBJECTS OF THE INVENTION

In view of the foregoing it is the aim of the invention to achieve the following objects singly or in combination:

to provide an apparatus for intermittently injecting liquids, especially in a vaporization heat exchanger for use in spacecraft;

to provide such an injection apparatus that operates in a substantially drip-free manner to efficiently achieve a high exploitation of the available injection liquid;

to provide such an injection apparatus that avoids or reduces ice build-up and the associated problems, without requiring auxiliary heating devices or with a reduced heating requirement;

to provide such an injection apparatus that has relatively few, and relatively low-mass, moving parts, and is therefore relatively easy and economical to manufacture, operate and maintain; and to provide a method for injecting a liquid, especially in a vaporization heat exchanger, whereby uncontrolled dripping of the liquid after the liquid delivery has been shut off is reduced or eliminated.

SUMMARY OF THE INVENTION

The above objects have been achieved according to the invention, in an injection nozzle having a nozzle housing enclosing an inside chamber divided into a discharge channel connected to the nozzle outlet and a receiving chamber. A piston is movably guided within the receiving chamber. The receiving chamber and the discharge channel are connected via a passage, which can be closed or sealed by a sealing element connected to the piston when the piston is in a rest position.

Further, according to the method of the invention the liquid remaining in the discharge channel after stopping the delivery of liquid is sucked or drawn out. Then, when the delivery of liquid is started again, the previously drawn-out liquid is again fed into the discharge channel.

By drawing the remaining liquid out of the nozzle's inside chamber after stopping the delivery of liquid, the uncontrolled dripping of liquid from the nozzle outlet is avoided. Thereby, the danger of icing-up the nozzle is avoided or significantly reduced. Consequently, it is not necessary to provide any auxiliary heating for the nozzle outlet, or at least it will only be necessary to provide nozzle heaters having a reduced heating capacity. Furthermore, because losses of vaporization liquid caused by inadvertent dripping are avoided, the total volume of liquid provided for vaporization cooling can be reduced.

The liquid injection apparatus according to the invention has an extremely compact embodiment because of the arrangement of a movable piston inside the nozzle housing. To carry out the liquid drawing-off operation described above, the piston is shifted, whereby it sucks or draws the excess remaining liquid out of the discharge channel and into the receiving chamber. After the draw-off operation is completed, the uncontrolled return flow of the liquid from the receiving chamber back into the discharge channel is prevented by a sealing element that is actuated by the piston.

When the piston is shifted in the opposite direction, the liquid is transported out of the receiving chamber and back into the discharge channel. Depending on the specific operating conditions at hand, this return flow of retained liquid can be carried out before, after or even during the next or restarted delivery of new liquid.

A compact and space saving arrangement using only low-mass moving parts is achieved using a piston having a substantially plate-like form and having at least one radial bore. This radial bore connects an inlet chamber arranged at the liquid supply in let with an axial bore arranged inside an operating shaft that extends from the piston into the discharge channel.

An especially light, yet at the same time stable, embodiment can be provided by forming the operating shaft substantially as a tubular shaft.

In order to integrate a valve function into the construction of the operating shaft and to provide that the valve function operates in response to the position of the piston, the operating shaft has a discharge head at its end away from the piston. The discharge head has discharge passages that are closed or sealed by a seal, such as a seal ring, when the piston is in a rest position.

In order to provide operating volumes that are separated from each other, a flexible seal is arranged between the piston and the nozzle housing to seal the receiving chamber relative to the inlet chamber.

In order to prevent the penetration of liquid into the area of a shaft that positions the piston, another flexible seal is arranged between the piston and the nozzle housing. This seal member seals the inlet chamber relative to an annular interspace that exists between the shaft for positioning the piston and a sleeve stub that guides the shaft. Sufficient flexibility of the seals is achieved, for example, by embodying at least one of the seals as an accordion pleated bellows seal.

The combination of the shaft and the shaft-guiding sleeve stub is liquid-tight in another embodiment. This is achieved by providing an electromagnet for positioning the shaft. The shaft acts as an armature and the electromagnet is arranged radially spaced around the shaft to position the shaft without contacting it.

According to the invention the number of individual parts needed and therewith the complexity of the apparatus can be reduced by providing for the positioning of the piston based on the liquid pressure in the area of the liquid supply.

An annular flange is provided to ensure that liquid can only flow between the receiving chamber and the discharge channel during the time in which the piston changes its position. To achieve this, the flange seals the receiving chamber relative to the discharge channel when the piston is in an operating position. The flange carries a substantially circular annular seal that cooperates with the sealing element when the piston is in an operating or working position.

The valve formed by the discharge head and its respective seal can be opened and closed in a defined and controlled manner, depending on the position of the operating shaft. This is achieved by biasing the seal toward the discharge head by means of a spring acting against the annular flange described above.

Through a further feature of the invention it is possible to reduce the volume of liquid that must be moved during the functional transition of the apparatus and thereby to shorten the response time lag of the apparatus and the total duration of an injection cycle. To achieve this, a valve is arranged to determinably seal the axial bore. The valve essentially comprises inlet ports and a seal and is arranged at the end of the piston toward the actuating shaft.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
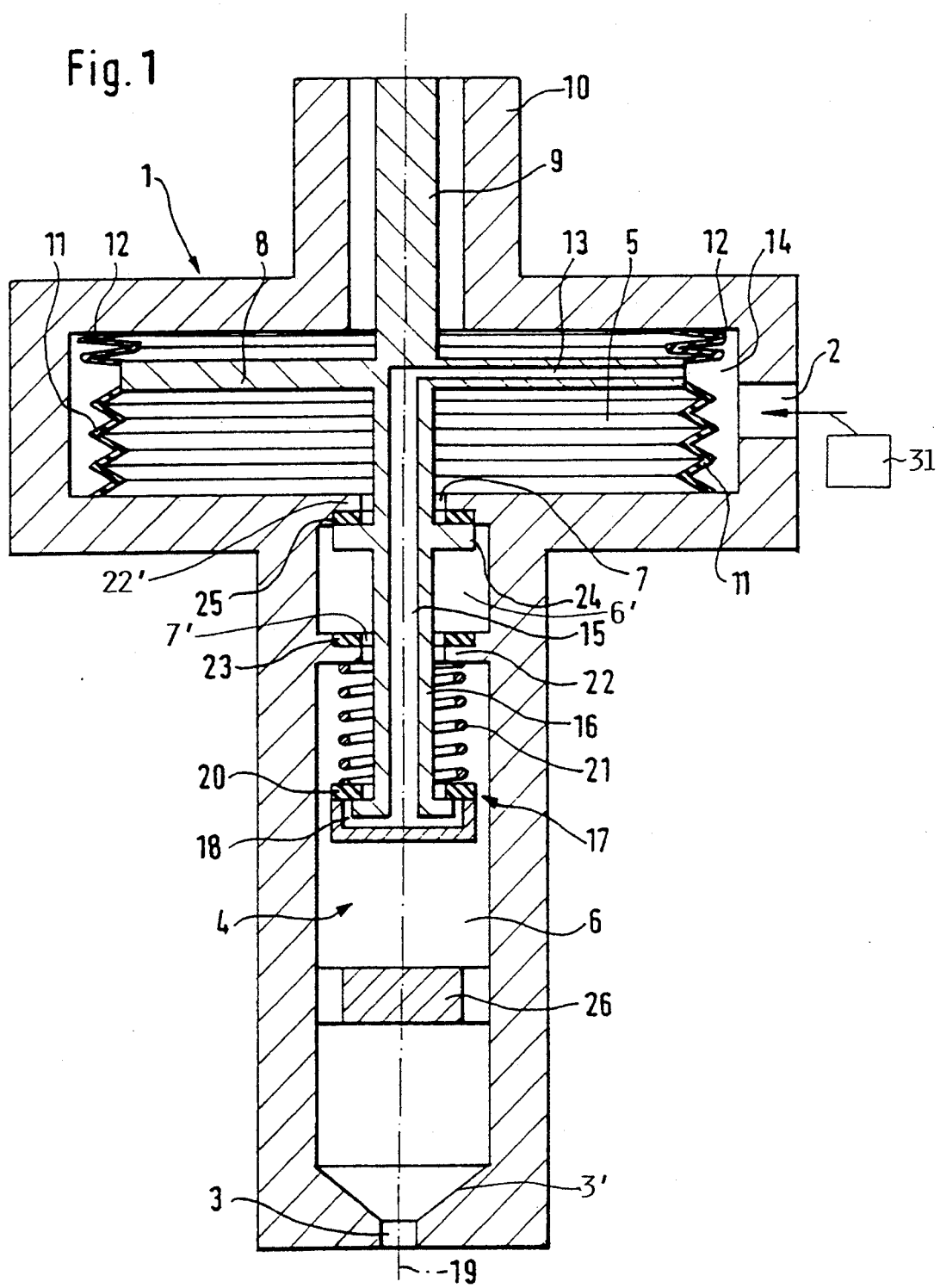
FIG. 1 is an axial section through an apparatus for injecting a liquid according to the invention, with various components shown in a closed or rest position of the apparatus.

As shown in FIG. 1, the apparatus for injecting a liquid essentially comprises a nozzle housing 1 having a liquid supply 2 and a nozzle outlet 3. The nozzle housing 1 encloses an inner chamber 4, which is divided generally into a receiving chamber 5 and a discharge channel 6. The receiving chamber 5 is connected for fluid flow to the discharge channel 6 by flow passages 7 and 7'.

A substantially disc- or plate-shaped piston 8 having a radial dimension substantially larger than an axial dimension is movably guided within the receiving chamber 5. The piston 8 is connected to and actuated by a shaft 9. The shaft 9 is movably guided within a sleeve stub 10, which extends from the nozzle housing 1 in a direction away from the discharge channel 6. Piston 8 has an essentially plate-like or disc-like shape and comprises a radial bore 13 connecting for fluid flow an inlet chamber 14 within the nozzle housing 1 and an axial bore 15. Inlet chamber 14 receives incoming liquid from liquid supply 2, which liquid is to be injected by the apparatus. The axial bore 15 extends axially within a substantially tube-shaped operating shaft 16, which extends from the piston 8 in a direction away from shaft 9. Thereby, liquid can flow from liquid supply 2 into inlet chamber 14 and then through radial bore 13 and axial bore 15 toward the discharge channel 6.

In the embodiment according to FIG. 1, piston 8 is sealed relative to the nozzle housing 1 by seals 11 and 12, whereby the seals 11 and 12 form the radially inner boundary of inlet chamber 14. Thus, the seals 11 and 12 prevent the uncontrolled entry of liquid from the inlet chamber 14 into the area of receiving chamber 5 or into the area between shaft 9 and sleeve stub 10. The seals 11 and 12 may, for example, be accordion-pleated bellows seals or simply flexible membranes.

A discharge head 17 is arranged at an end of operating shaft 16 opposite the piston 8. The axial bore 15 extends through shaft 16 to the discharge head 17, where the axial bore 15 is divided into discharge passages 18. The passages 18 turn the fluid flow around in a U-shape into a direction toward the piston 8. Thereby, the fluid flow from axial bore 15 is redirected first from a direction along the axis 19 of the shaft 16 into a radial direction and then into a direction parallel to the axis 19 toward piston 8.

FIG. 1 shows the various components positioned in a closed, shut-off or rest position. In this position, a seal 20 is closed against the discharge passages 18 of the discharge head 17, thereby preventing the escape of liquid from the discharge head 17. The seal 20 may, for example, be a seal ring or seal washer, which is held in place and biased toward the discharge head 17 by a spring 21. The spring 21 is arranged coaxially around shaft 16 on axis 19 and is held at its end opposite seal washer 20 by a flange 22.

Figure 2:
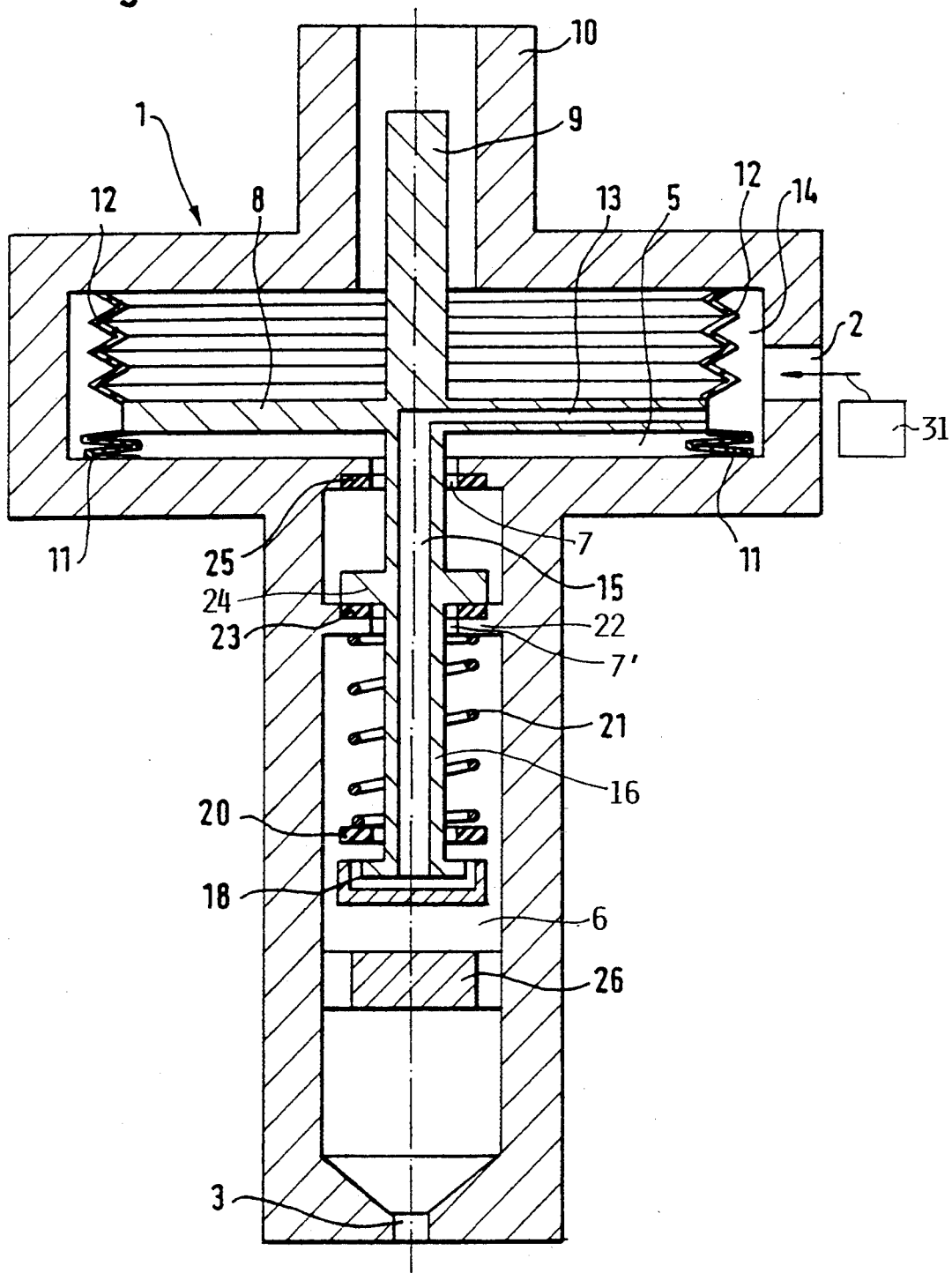
FIG. 2 is an axial section of the same apparatus as shown in FIG. 1, but with the various components shown in an open or operating position of the apparatus.

The flange 22 extends radially from the nozzle housing 1 into the discharge channel 6. The flange 22, which may be a radial, annular flange, carries a seal ring 23 on its side opposite the spring 21. If the apparatus is in an operating condition and the components are in operating positions as shown in FIG. 2 and described more fully below, then the seal ring 23 is contacted by a shut-off or sealing element 24 connected with the operating shaft 16. The sealing element 24 may, for example, be a flange radially extending from and encircling the operating shaft 16. The seal created by the sealing element 24 against the seal ring 23 while the apparatus is in an operating position as shown in FIG. 2, prevents the flow of liquid from the receiving chamber 5 into the discharge channel 6 through a flow passage 7' arranged annularly between shaft 16 and flange 22.

However, while the apparatus is in a rest position as shown in FIG. 1, the sealing element 24 does not seal flow passage 7' by sealing against seal ring 23. Rather, the sealing element 24 then closes off the flow passage 7 as shown in FIG. 1. Another seal ring 25 is arranged on a flange 22' around the passage 7 on a side of the flange 22' directed toward the sealing element 24. In the rest position shown in FIG. 1, the seal ring 25 is contacted by sealing element 24 to prevent the flow of liquid out of the receiving chamber 5 through passage 7 into a valve chamber 6' and ultimately to the discharge channel 6. Thus, the valve chamber 6', bounded radially by the housing 1 and axially by the flange 22 and the flange 22', is sealed against fluid flow in both the rest position shown in FIG. 1, and the operating position shown in FIG. 2. In the rest position, the sealing element 24 seals against seal ring 25 to close passage 7 at one end of chamber 6' and in the operating position, the sealing element 24 seals against seal ring 23 to close passage 7' at the other end of chamber 6'.

A swirl or twist baffle 26 is arranged in the discharge channel 6 near the nozzle outlet 3. The twist baffle 26 induces a rotational motion in the flowing liquid about the longitudinal axis 19 and thereby aids the break-up, turbulence and spraying distribution of the liquid from the nozzle outlet 3. In order to improve the flow properties, the discharge channel 6 transitions into the nozzle outlet 3 via sloped walls 3' arranged at the outlet end of the channel 6. The sloped walls 3' may, for example, be conically tapered walls.

It should be understood that in the resting position shown in FIG. 1, liquid is present in the receiving chamber 5, but no liquid is shown in the drawings for the sake of clarity. The liquid had remained in the discharge channel 6 at the end of the last operating cycle, but was sucked into the receiving chamber 5 by the return stroke of piston 8 back into its rest position. The receiving chamber 5 is bounded radially outwardly by the seal 11 outside of which is the inlet chamber 14 connected to the liquid supply 2. The sealing element 24 cooperating with the seal ring 25 closes the passage 7 and spring 21 pushes the seal ring 20 against the discharge head 17 to close the passages 18. Thus, liquid can escape neither from the receiving chamber 5 through the passage 7 nor from the axial bore 15 through the discharge head 17. Preferably, the receiving chamber 5 is dimensioned so that it can hold the same volume of liquid that the discharge channel 6 can hold.

To initiate the next liquid spraying or injection cycle, shaft 9 is moved downward in the view of FIG. 1 by means not shown in FIG. 1 and not described here. Thereby piston 8 is moved out of the rest position shown in FIG. 1 and toward the operating position shown in FIG. 2. By moving toward the operating position, the piston 8 pushes the liquid out of the receiving chamber 5, through the passage 7, through the chamber 6', through the passage 7', and into the discharge channel 6. This fluid flow is possible because the piston 8 is coupled to the sealing element 24 by the operating shaft 16, so that when the piston 8 moves then the sealing element 24 moves away from the seal ring 25, which enables the liquid to get through the passage 7. This fluid flow remains possible during the transition motion of piston 8 and the shaft 16, but after piston 8 is moved fully into its end position, which is the injection operating position shown in FIG. 2, the sealing element 24 contacts the seal ring 23 and creates a liquid-tight seal to close passage 7'. As the operating shaft 16 and connected therewith the discharge head 17 move out of the position of FIG. 1, the spring 21 is slackened and after a definable path length the discharge head 17 is pushed away from the seal ring 20. Thereby, the discharge passages 18 are opened to allow the flow of liquid to be injected.

FIG. 2 shows the same apparatus as shown in FIG. 1, but with the components moved into an injecting operating position. Thus, a fluid flow path exists for the liquid to be injected, from the liquid supply 2, into the inlet chamber 14, through radial bore 13, axial bore 15 and passages 18 into discharge channel 6 and from there finally out of nozzle opening 3, as described above. Fluid flow through passage 7' is blocked as described above.

It should be understood that during the motion of piston 8, the space bounded by piston 8 and seal 12 may be vented if necessary, for example through the annular space between shaft 9 and sleeve stub 10 in a manner not shown or described in detail. Furthermore, it is to be understood that guide bushings, bearings, packing or the like for guiding and sealing shaft 9 and/or shaft 16 can be provided as necessary and are understood in the art, but are not shown for the sake of clarity.

The piston 8 may be moved or positioned mechanically by means of the shaft 9 in a manner not shown in detail. It is also possible to drive shaft 9 in response to the pressure at hand in the area of the liquid supply 2, if suitable pressure actuated means are provided, including a pressure sensor 31.

Figure 4:
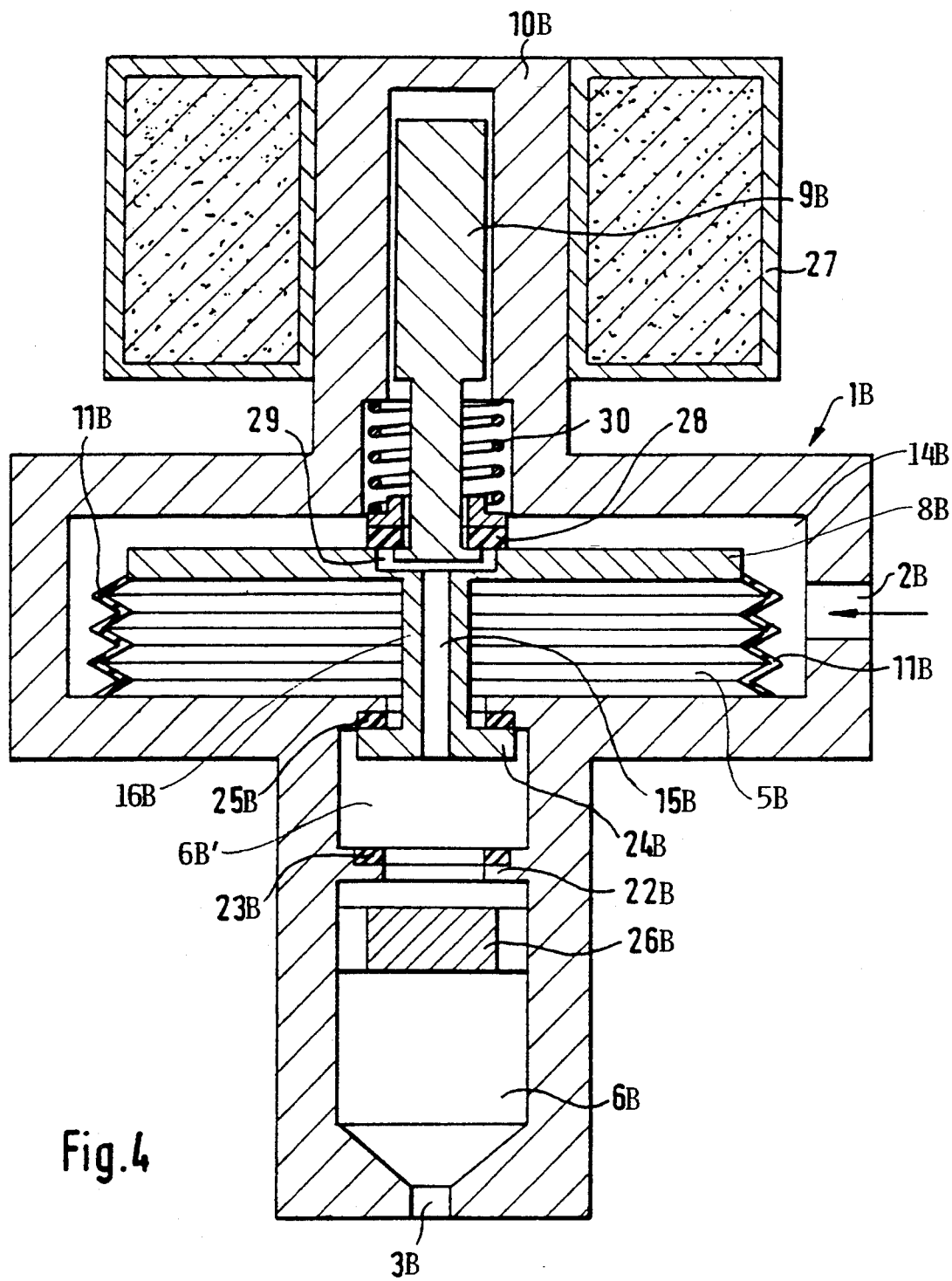
FIG. 4 is an axial section through a further embodiment of the apparatus according to the invention, in which the piston displacement volume is reduced to a minimum by a modification of the liquid flow path and in which the piston is positioned by means of an electromagnet.

As shown in FIG. 4, it is also possible to use an electromagnet 27 to move a piston 8B. In the embodiment shown in FIG. 4, components having a reference number with a "B" suffix are similar to corresponding components in the embodiment of FIGS. 1 and 2 having the same reference number without the "B" suffix. In this embodiment, shaft 9B acts as an armature for the electromagnet 27 mounted on the housing 1B. The piston 8B does not have a radial bore and shaft 16B does not have a discharge head, so that the axial bore 15B flows directly into the valve chamber portion 6B' of the discharge channel 6B. Instead of having a combination of a discharge head and a seal ring, this embodiment has a seal ring 28, which is arranged at the side of piston 8B facing the shaft 9B in order to seal inlet ports 29 of piston 8B, when the piston is in the rest position as shown. A spring 30 is arranged in the sleeve stub 10B around the shaft 9B to hold the seal 28 in place and bias the seal 28 toward piston 8B. The inlet ports 29 in piston 8B open at one end in an axial direction toward the shaft 9B or more particularly, the seal 28.

After turning in an L-shape, the ports 29 open at the other end in a radial direction into axial bore 15B. Thus, the ports 29 form a U-shaped fluid passage between an inlet chamber 14B and the axial bore 15B. In effect, the radial bore 13 of piston 8 (FIG. 1) is replaced by inlet ports 29 of piston 8B. In order to allow liquid to flow into the area of the inlet ports 29, no seals 12 (FIG. 1) are used in this embodiment. Thus, inlet chamber 14B is enlarged to extend radially inwardly to the area of shaft 9B. Because of the closed construction of the sleeve stub 10B, and the electromagnetically driven, contact-free operation of shaft 9B by the electromagnet 27, the lack of seals 12 does not cause any leakage or sealing problems. Seals 11B are provided in a manner similar to seals 11 in FIG. 1.

While not shown in a separate figure, the embodiment shown in a rest position in FIG. 4 can be moved to an operating or injecting position similar to the position shown in FIG. 2. To initiate an injection cycle or operation, the electromagnet 27 is controlled by means not shown here, so that shaft 9B and therewith piston 8B moves in a downward direction in the view of FIG. 4. After piston 8B moves a certain distance, spring 30 becomes slack and piston 8B moves away from seal ring 28. This opens ports 29 to allow liquid flow from liquid supply 2B through axial bore 15B, chamber 6B', swirl or twist baffle 26B, channel 6B and finally out through nozzle outlet 3B. Sealing element 24B has moved away from seal ring 25B to allow liquid to flow from receiving chamber 5B through chamber 6B' and finally out nozzle outlet 3B. When piston 8B has moved to its final operating position, sealing element 24B contacts seal ring 23B arranged on an annular flange 22B to block liquid flow between chamber 5B and channel 6B.

To stop the injection cycle and return to the rest position, electromagnet 27 is controlled to move piston 8B in an upward direction in the view of FIG. 4. Thereby, the seal between seal ring 23B and element 24B opens, allowing liquid to be sucked out of channel 6B into receiving chamber 5B. Seal 28 closes ports 29 to shut off liquid flow from liquid supply 2B through bore 15B.

In the embodiment of FIG. 4, the volume of the discharge channel 6B is reduced relative to that of channel 6 of FIG. 1. This is achieved by shifting the valve formed by seal ring 28 and inlet ports 29, for controlling the main liquid flow, toward the region of the shaft 9B, i.e., to the other end of shaft 16B. The reduction of the discharge channel volume also reduces the liquid volume that must be sucked up and stored by the receiving chamber 5B, and consequently also reduces the masses that must be moved in operating the apparatus. As a result, the response time of the apparatus, as well as the necessary energy to be expended, are reduced.

Figure 3:
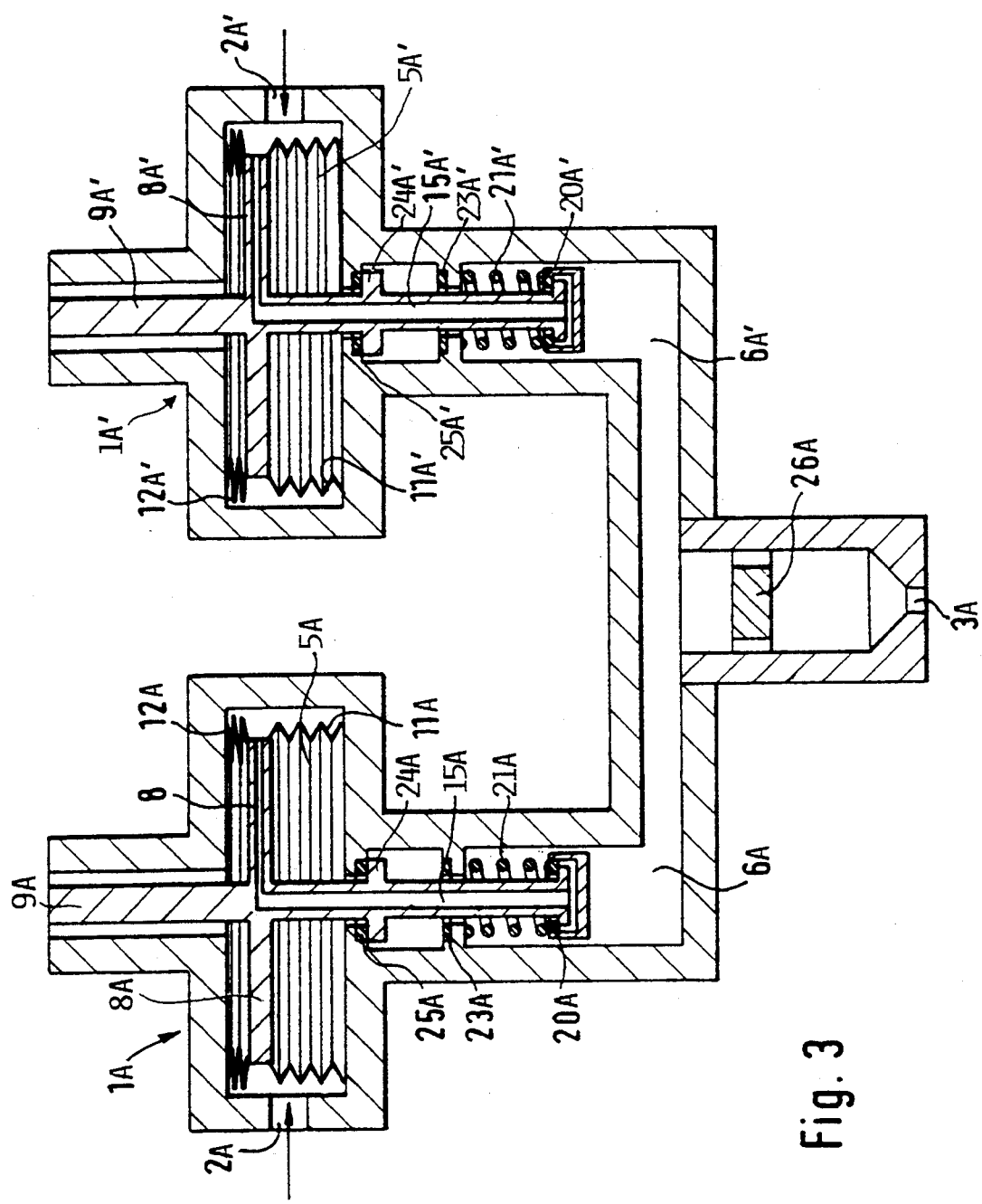
FIG. 3 is an axial section through another embodiment of the apparatus according to the invention, having two liquid supplies, two receiving chambers, and two discharge channels that come together near a single nozzle outlet.

The embodiment of FIG. 3 includes similar components as shown in FIGS. 1 and 2, bearing the same reference numbers with the suffix "A" added. Furthermore, many of the components are duplicated, as shown by reference numbers with the suffixes "A" and "A'". Thus, this embodiment includes two housings 1A and 1A', two pistons 8A and 8A', replace "as well as two" by two receiving chambers 5A and 5A', seals 11A, 11A' and 12A, 12A', liquid supply passages 2A, 2A', seal rings 25A, 25A'; 23A, 23A' and 20A, 20A', sealing elements 24A, 24A'; and springs 21A, 21A', etc. The discharge channels 6A and 6A' join together upstream of a single twist baffle 26A near the single nozzle outlet 3A.

Because the invention makes it possible to draw the remaining liquid out of the discharge channels 6, 6A, 6A', or 6B' by suction, there is no need to minimize the volume between any of the nozzle outlets 3, 3A or 3B and any liquid sealing means for stopping the liquid flow. Thus, it is possible to locate the necessary sealing means independently of the location of any of the nozzle outlets 3, 3A or 3B. Thereby, the freedom of construction is increased. Moreover, the great variability of structural embodiments enabled by the invention make it possible to carry out optimizations. For example, according to the embodiment shown in FIG. 3, it is possible to achieve a redundancy of components by providing two independent sets of liquid flow controlling elements to cooperate with one nozzle outlet 3A. If any type of failure occurs in one of these sets of components, then the failing components can be disabled if necessary, and the intended function can be carried out without any interruption or limitation by the other set of components. Because both sets of liquid flow controlling components supply a common, single nozzle outlet 3A, a uniform spray or injection distribution is achieved regardless which one of the two liquid supplies is active or if both are simultaneously active.

It should be understood that various modifications to the specific embodiments shown and described above are possible within the scope of the invention. For example, the springs 21, 21A, 21A' and 30 can be replaced by any comparable component having a flexible quality and providing a resistance to compression forces. For example, a membrane or an accordion-pleated bellows could be used. Furthermore, various controls, components or drive means can be used to actuate and define the position of any of the pistons 8, 8A, 8A' or 8B. For example, a return biasing spring can be used to cooperate with electromagnet 27. Additional seals or packing, such as bellows seals, may be provided, for example to prevent the access of liquid into the space between shaft 9B and the sleeve stub 10B.

Although the invention has been described with reference to specific example embodiments, it will be appreciated that it is intended to cover all modifications and equivalents within the scope of the appended claims.

What we claim is:

1. A method of injecting a liquid, comprising the following steps:
   (a) supplying fresh liquid and causing the fresh liquid to flow into a nozzle chamber;

(b) during causing the fresh liquid to flow in step (a), also positively forcing retained liquid from a prior injection cycle to flow from a receiving chamber into the nozzle chamber;

(c) spraying liquid from the nozzle chamber through a nozzle outlet;

(d) stopping the flow of fresh liquid; and (e) sucking liquid retained in the nozzle chamber out of the nozzle chamber and into the receiving chamber.

2. The method of claim 1, further comprising positively stopping the flow of retained liquid after step (e).

3. The method of claim 1, wherein sucking out retained liquid in step (e) begins before stopping the flow of fresh liquid in step (d) and continues and then ends after stopping the flow of fresh liquid in step (d).

4. The method of claim 1, wherein step (a) comprises opening a third valve, step (b) comprises opening a first valve, and step (d) comprises closing the third valve, and wherein opening the first valve takes place before opening the third valve.

5. The method of claim 4, wherein step (e) comprises opening a second valve, said method further comprising positively stopping the flow of retained liquid after step (e) by closing the second valve.

6. An apparatus for injecting a liquid, comprising a housing bounding an internal space and having a liquid inlet and a nozzle outlet, the apparatus further comprising a substantially plate-shaped movable piston having a radial dimension substantially larger than an axial dimension, and a first valve responsive to movement of the piston, wherein the internal space is divided into at least a discharge channel communicating with the nozzle outlet and a receiving chamber communicating through a first passage with the discharge channel, and wherein the piston is movably arranged in the housing to define a boundary of the receiving chamber, and the first valve closes the first passage responsively to the piston being located in a rest position.

7. The apparatus of claim 6, wherein the liquid inlet communicates with the discharge channel.

8. The apparatus of claim 7, further comprising a movable operating shaft connected to the piston, and wherein the internal space further includes an inlet chamber communicating with the liquid inlet, a radial bore extends radially through at least a portion of the piston and communicates with the inlet chamber, an axial bore extends axially through at least a portion of the operating shaft and communicates with the radial bore, and the liquid inlet communicates with the discharge channel through the inlet chamber, the radial bore and the axial bore.

9. The apparatus of claim 3, further comprising a discharge head arranged on an end of the operating shaft opposite the piston, and comprising a discharge head seal member, and wherein the discharge head includes a discharge passage communicating with the axial bore and with the discharge channel, and the discharge head seal member closes the discharge passage responsively to the piston being located in the rest position.

10. The apparatus of claim 9, further comprising a spring arranged to bias the discharge head seal member toward the discharge head.

11. The apparatus of claim 8, wherein the operating shaft is substantially tube-shaped.

12. The apparatus of claim 6, further comprising a flexible receiving chamber seal arranged between the piston and the housing to separate the receiving chamber from the liquid inlet.

13. The apparatus of claim 12, further comprising a flexible piston seal arranged between the piston and the housing to separate the liquid inlet from a space on a side of the piston opposite the receiving chamber.

14. The apparatus of claim 13, wherein at least one of the receiving chamber seal and the piston seal is an accordion-pleated bellows seal.

15. The apparatus of claim 6, further comprising a movable actuator shaft operatively connected to the piston and a sleeve stub on the housing for receiving and guiding the actuator shaft.

16. The apparatus of claim 15, further comprising an electromagnet arranged radially around the actuator shaft which forms an armature of the electromagnet, and wherein the electromagnet can be controlled to move the actuator shaft.

17. The apparatus of claim 6, further comprising a seal member, and wherein an inlet passage passes through the axial thickness of the piston to allow liquid communication from the liquid inlet to the discharge channel, and wherein the seal member is arranged on an inlet side of the piston to close the inlet passage responsively to the piston being located in the rest position.

18. The apparatus of claim 17, further comprising a spring arranged to bias the seal member toward the piston and the inlet passage.

19. The apparatus of claim 6, further comprising a pressure sensor arranged to sense a liquid pressure existing at the liquid inlet, and wherein the motion of the piston is responsive to the pressure sensed by the pressure sensor.

20. An apparatus for injecting a liquid, comprising a housing bounding an internal space and having a liquid inlet and a nozzle outlet, the apparatus further comprising a movable piston, and a first valve responsive to movement of the piston, wherein the internal space is divided into at least a discharge channel communicating with the nozzle outlet and a receiving chamber communicating through a first passage with the discharge channel, and wherein the piston is movably arranged in the housing to define a boundary of the receiving chamber, and the first valve closes the first passage responsively to the piston being located in a rest position, said apparatus further comprising a flexible receiving chamber seal arranged between the piston and the housing to separate the receiving chamber from the liquid inlet, and a flexible piston seal arranged between the piston and the housing to separate the liquid inlet from a space =on a side of the piston opposite the receiving chamber.

21. An apparatus for injecting a liquid, comprising a housing bounding an internal space and having a liquid inlet and a nozzle outlet, the apparatus further comprising a movable piston, and a first valve responsive to movement of the piston, wherein the internal space is divided into at least a discharge channel communicating with the nozzle outlet and a receiving chamber communicating through a first passage with the discharge channel, and wherein the piston is movably arranged in the housing to define a boundary of the receiving chamber, and the first valve closes the first passage responsively to the piston being located in a rest position, said apparatus further comprising a movable actuator shaft operatively connected to the piston and a sleeve stub arranged on the housing to receive and guide the actuator shaft, an electromagnet arranged radially around the actuator shaft which forms an armature of the electromagnet, and wherein the electromagnet can be controlled to move the actuator shaft.

22. An apparatus for injecting a liquid, comprising a housing bounding an internal space and having a liquid inlet and a nozzle outlet, the apparatus further comprising a movable piston, and a first valve responsive to movement of the piston, wherein the internal space is divided into at least a discharge channel communicating with the nozzle outlet and a receiving chamber communicating through a first passage with the discharge channel, and wherein the piston is movably arranged in the housing to define a boundary of the receiving chamber, and the first valve closes the first passage responsively to the piston being located in a rest position, said apparatus further comprising a second valve responsive to movement of the piston and a second passage in series communication with the first passage between the receiving chamber and the discharge channel, and wherein the second valve closes the second passage responsively to the piston being located in an operating position.

23. The apparatus of claim 22, wherein both the first valve and the second valve are open for liquid flow through the first passage and the second passage responsive to the piston moving in a transition between the rest position and the operating position and vice versa.

24. The apparatus of claim 23, further comprising a first seal member arranged at the first passage, a second seal member arranged at the second passage and a sealing element connected to move responsively with the piston, and wherein the first seal member cooperating with the sealing element forms the first valve and the second seal member cooperating with the sealing element forms the second valve.

* * * * *

UNITED STATES PATENT AND TRADEMARK OFFICE
CERTIFICATE OF CORRECTION

PATENT NO. : 5,423,482
DATED : June 13, 1995
INVENTOR(S) : Mueller et al.

It is certified that error appears in the above-identified patent and that said Letters Patent is hereby corrected as shown below:

Col. 8, line 12, replace "replace "as well as two" " by
--two shafts 9A and 9A',--;

line 13, delete "by".

Col. 9, line 53, replace "claim 3" by --claim 8--.

Col. 10, line 50, delete "-";
line 51, delete "=".

Signed and Sealed this

Twenty-second Day of August, 1995

Attest:

BRUCE LEHMAN

Attesting Officer        Commissioner of Patents and Trademarks